UNITED STATES PATENT OFFICE.

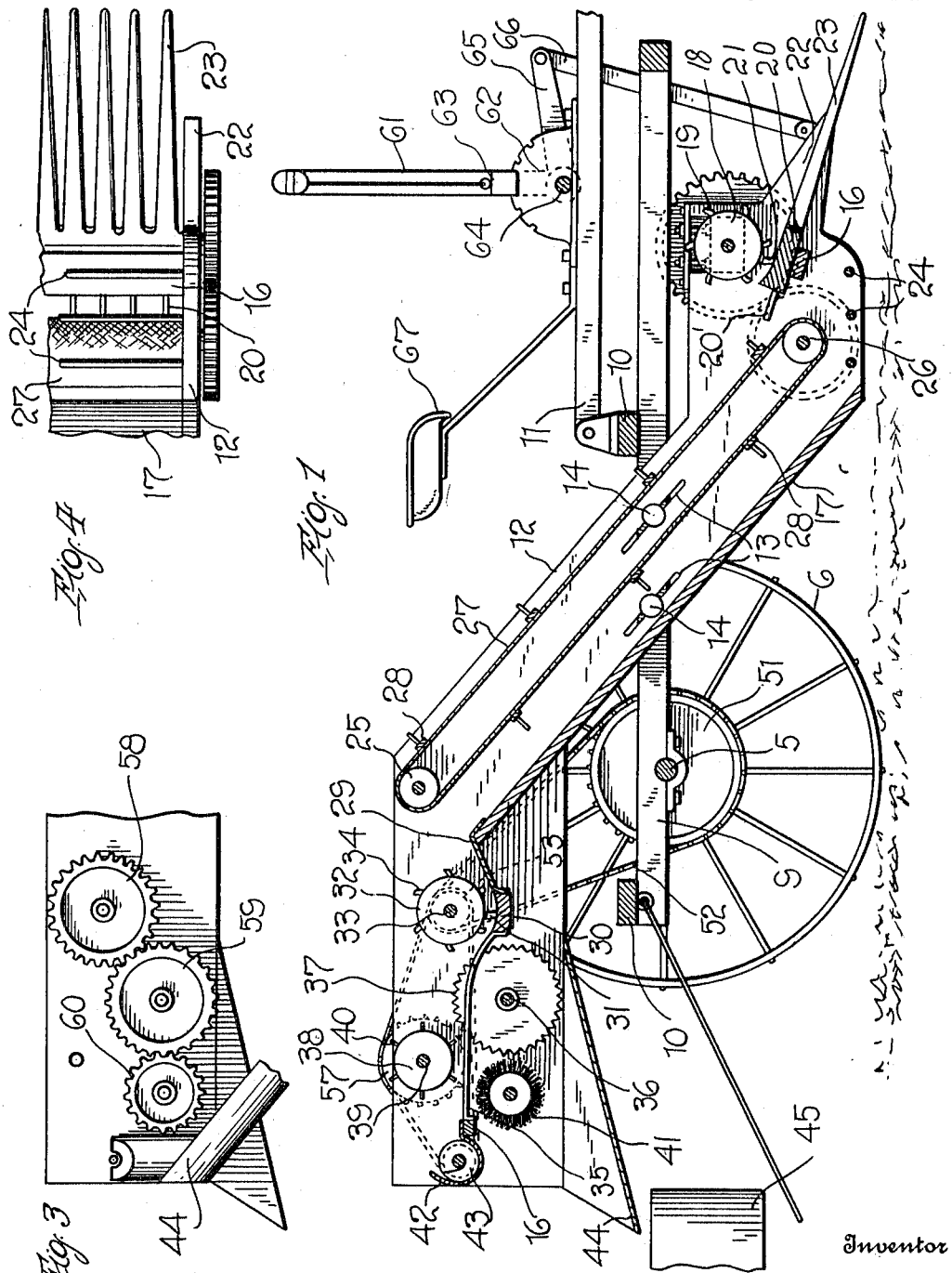

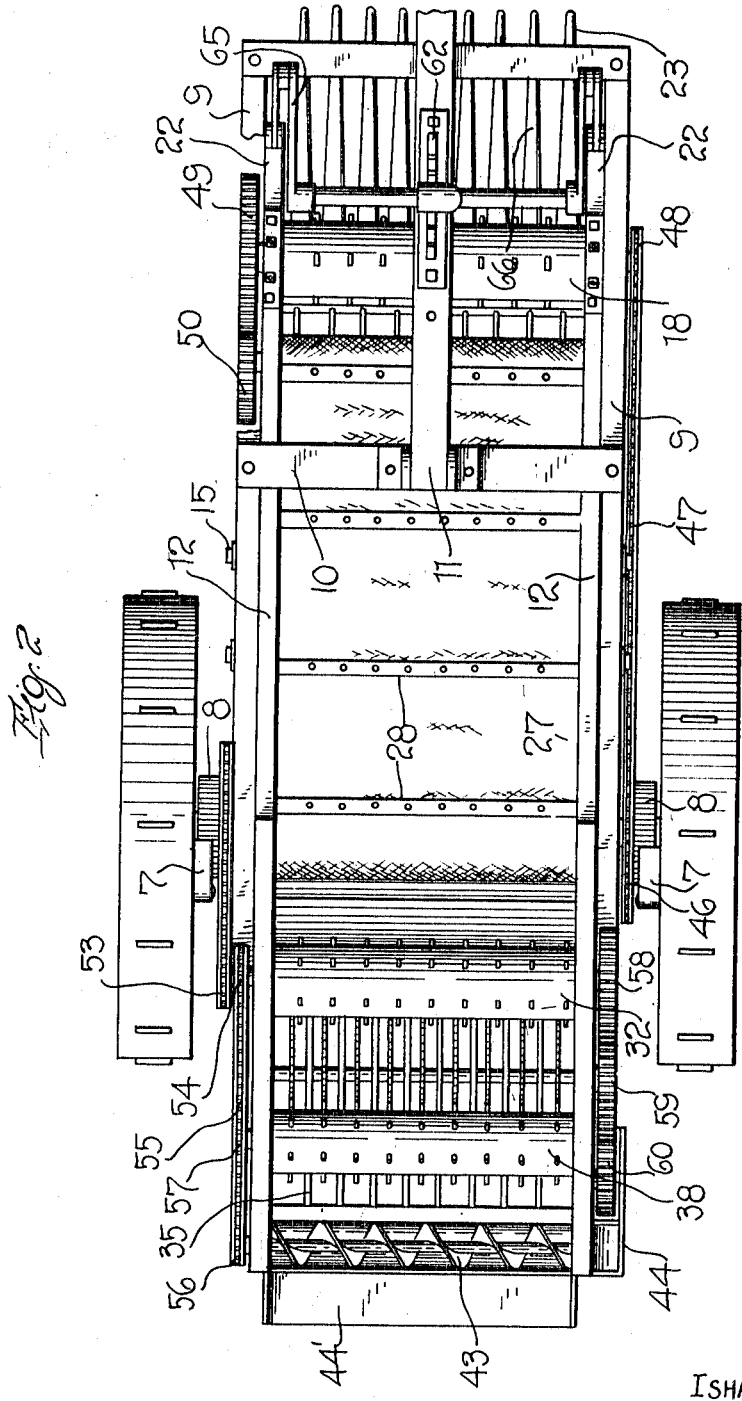

ISHAM F. WILCOXSON, OF DRYDEN, OKLAHOMA, ASSIGNOR OF ONE-HALF TO GEORGE W. METCALF, OF DRYDEN, OKLAHOMA.

HARVESTING-MACHINE.

1,106,019.          Specification of Letters Patent.          Patented Aug. 4, 1914.

Application filed November 26, 1913. Serial No. 803,229.

*To all whom it may concern:*

Be it known that I, ISHAM F. WILCOXSON, a citizen of the United States, residing at Dryden, in the county of Harmon and State of Oklahoma, have invented certain new and useful Improvements in Harvesting-Machines, of which the following is a specification, reference being had to the accompanying drawings.

This invention relates to improvements in harvesting machines of that character shown and described in my prior application for Patent Serial No. 789,910, filed September 15, 1913, and has for its primary object to provide certain material improvements in such machines whereby their serviceability and scope of utility in practical use is materially increased.

My invention has for a more particular object to provide improved means for separating the bolls from the cotton and discharging the same from the machine in its movement across the field.

My invention has for still another object to provide improved means for effectually removing grass, leaves or other refuse matter from the cotton before it is finally discharged from the machine.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a vertical longitudinal section through a cotton harvesting machine embodying the invention in its preferred form; Fig. 2 is a top plan view thereof; Fig. 3 is an enlarged fragmentary section illustrating the driving gearing; Fig. 4 is a detail fragmentary bottom plan view.

Referring in detail to the drawings, 5 designates the supporting shaft or axle upon the opposite ends of which the traction or ground wheels 6 are loosely mounted. These wheels which may be of any ordinary or approved construction are provided with pawls 7 adapted for engagement with suitable ratchets 8 fixed to the shaft 5, whereby said shaft is caused to rotate upon the forward movement of the machine.

Upon the axle or shaft 5 of the machine, spaced parallel longitudinal bars 9 are loosely mounted adjacent their rear ends. These parallel bars are connected by a series of transverse bars 10. To one of the latter bars, the rear end of the draft tongue 11 is pivotally connected. Between the longitudinal bars 9 the side members 12 of a frame are arranged, each of said side members having obliquely disposed portions and longitudinally extending end portions as shown. The obliquely disposed portions of these side members are provided with spaced slots 13 to receive bolts 14 mounted in the bars 9, and upon the outer ends of said bolts suitable clamping nuts 15 are threaded to clamp the side members 12 in their adjusted positions between the longitudinal bars. The frame members 12 have their horizontal rearwardly extending end portions connected by the transverse bars 16 and a base or floor 17 is arranged between the obliquely disposed portions of said side members at their lower edges.

Between the forward ends of the members 12, the transversely disposed cylinder 18 is mounted, said cylinder being preferably adjustable vertically in the manner disclosed in my prior application hereinbefore referred to. This cylinder is provided upon its periphery with a plurality of teeth 19 which are adapted to coöperate with the series of teeth 21 on the transverse bar 20 to cut or break open the cotton bolls. The forward ends of the side members 12 are provided with extensions 22 and between these extensions, a plurality of longitudinally extending parallel rake tines or rods 23 are arranged, said tines being fixed at their rear ends in the bar 20. A plurality of spaced transverse rods 24 connect the lower edges of the frame members 12 in advance of the floor 17.

Rollers 25 and 26 are mounted between the upper and lower ends respectively of the obliquely disposed intermediate portions of the frame members 12, and an endless apron or conveyer 27 traverses these rollers. This apron is preferably provided with a plurality of spaced tooth carrying bars 28 for a purpose which will be later referred to.

The cotton is discharged from the upper end of the apron upon a plate 29, one end of which is fixed to the upper end of the floor 17 and the other end thereof suitably secured to a bar 30 which is provided with upstanding teeth 31. 32 designates a roller mounted immediately above the bar 30 upon a shaft 33. This roller is provided with the peripheral teeth 34 which are adapted to move between the teeth upon the bar 30. A plurality of parallel longitudinal spaced rods 35 are secured at their ends to the bar 30 and to the rear transverse bar 16 respectively. Upon a transverse shaft 36 journaled at its ends in the side members 12, a plurality of circular saws 37 are secured. These saws project upwardly between the spaced rods 35 and are adapted to remove the cotton from the bolls as will be later referred to. Above the rods 35 and rearwardly of the saws 37 a roller 38 is fixed upon the transverse shaft 39 which is journaled at its ends in the side members 12. This roller is also provided with peripheral teeth 40. Below the rods 35 and also rearwardly of the saws 37 a rotatable brush 41 is mounted between the members 12. A transversely disposed casing or trough 42 is mounted upon the bar 16 and in the same the spiral conveyer 43 is arranged. This conveyer at one of its ends discharges into a chute 44 mounted upon one of the side members 12. An inclined cotton discharge chute 44′ is secured to the lower edges of the members 12 and is adapted to discharge the cotton from the machine into the body of a suitable vehicle indicated at 45 which is connected in any suitable manner to the rear end of the machine.

Upon one end of the wheel shaft 5 a sprocket wheel 46 is secured and is connected by a chain 47 to a similar sprocket wheel 48 secured upon one end of the shaft of the cylinder 18. Upon the other end of this cylinder shaft a gear wheel 49 is fixed which meshes with the gear 50 secured upon the shaft of the lower apron roller 26. Upon the other end of the wheel shaft 5, a sprocket wheel 51 is secured and is connected by the chain 52 to a sprocket pinion 53 fixed upon one end of the shaft 33 upon which the toothed roller 32 is secured. This shaft is also provided with a second sprocket pinion 54 which is connected by the chain 55 to a sprocket pinion 56 upon one end of the shaft of the spiral conveyer 43. This chain also engages a sprocket wheel 57 secured upon one end of the shaft 39 of the roller 38 whereby said roller is operated. Upon the other end of the shaft 33 a gear wheel 58 is secured and meshes with a similar gear wheel 59 fixed upon one end of the saw blade shaft 36. This latter gear in turn meshes with the pinion 60 secured upon one end of the shaft of the brush 41.

The inclination of the frame of the machine upon the wheel shaft 5 may be readily adjusted through the medium of a lever 61 which is mounted upon a rack segment 62 fixed upon the vehicle tongue 11, said lever being provided with the usual spring pressed locking dogs 63 for engagement with the teeth of said rack. The pivot rod 64 of the lever extends upon opposite sides of the rack and to the ends thereof the arms 65 are fixed at one of their ends. The other ends of these arms are pivotally connected to the upper ends of the links 66, the lower ends of which are pivotally connected to the extensions 22 of the side members 12. The operator's seat 67 is mounted upon the rear end of the tongue 11. It will be readily understood that by simply shifting this lever, the frame may be oscillated upon the wheel shaft and the tines 23 raised or lowered to the proper elevation with respect to the ground as may be desired.

Having now specifically described the construction and arrangement of the several parts constituting my improved harvesting machine, the operation thereof will be understood as follows: In the movement of the machine across the field, the cotton stalks are directed by the forwardly extending tines 23 against the rotating cylinder 18. The teeth 19 of this cylinder strip the stalks of their pods and carry the pods rearwardly over the toothed bar 20. The teeth of this bar coöperating with the teeth 19 of the cylinder cut or break open the cotton bolls. Short rearwardly projecting rods 20′ fixed in the rear edge of the bar 20 direct the cotton upon the upper stretch of the apron 27. Any cotton which may fall between the spaced rods 20′ will lodge upon the transverse rods 24 disposed beneath the lower end of the apron and be caught by the teeth upon the apron slats 28 in the movement of the apron around the lower roller 26. The cotton is carried upwardly by the apron and discharged upon the downwardly inclined plate 29 fixed to the upper end of the floor 17. It is now caught by the teeth of the cylinder 33 and forced between the teeth 31 by which the complete opening of the bolls is assured. The saws 37 now catch the cotton and pull the same downwardly between the parallel rods 35 and completely separate the same from the bolls. The toothed cylinder 38 directs the bolls rearwardly over said rods into the trough 42 of the spiral conveyer 43. This conveyer directs the bolls transversely and discharges the same from the machine into the downwardly inclined chute 44. The revolving brush 41 removes the cotton from the teeth of the saw blades 37, the same falling upon the downwardly inclined discharge chute 44′ by which it is discharged into the trailing vehicle 45.

From the above it is believed that the construction and manner of operation of my invention will be clearly and fully understood.

The machine is comparatively simple and inexpensive in construction and highly satisfactory and serviceable in practical use.

It will be seen that the cotton bolls are separated from the cotton after the same has been stripped from the stalks and the cotton is delivered from the machine practically free of refuse matter.

It will, of course, be apparent that in putting my invention into practical use, it may be found desirable to make many changes in the form, proportions and arrangement of the several elements above referred to and I, therefore, reserve the right to resort to all such legitimate changes as may be fairly embodied in the spirit and scope of the invention, as claimed.

What I claim is:

1. In a machine of the character described, a frame, means mounted in the forward end of the frame to strip the cotton from the stalks, an inclined apron arranged in said frame, a toothed roller mounted in the rear end of the frame at the upper end of said apron, a toothed bar disposed beneath said roller, a plurality of spaced parallel rods extending rearwardly from the toothed bar, a transversely disposed conveyer arranged at the rear ends of said rods, a plurality of revoluble saws mounted in the frame beneath said rods and projecting upwardly through the spaces between the same, a toothed roller mounted above the rods rearwardly of the saws, a rotary brush mounted in the frame beneath said rods and contiguous to the saws to engage and remove the cotton therefrom, a toothed roller to direct the bolls rearwardly over the rods to the transverse conveyer whereby they are discharged from the machine.

2. In a machine of the character described, a frame, a toothed cylinder mounted in the forward end of said frame, a plurality of longitudinally disposed tines arranged below and extending in advance of said cylinder, a rearwardly and upwardly inclined endless apron mounted in the frame, a plurality of rods extending rearwardly from the tines to direct the cotton upon the apron, a plurality of transversely disposed rods mounted in the frame beneath the lower end of said apron, and means mounted in the frame rearwardly of the upper end of the apron to receive the cotton and separate the same from the bolls.

3. In a machine of the character described, a frame, a toothed cylinder mounted in the forward end of said frame, a toothed bar arranged below said cylinder, a plurality of longitudinally disposed tines extending forwardly from said bar, a rearwardly extending upwardly inclined apron mounted in the frame, a plurality of spaced rearwardly extending rods fixed to said bar to direct the cotton upon the apron, a plurality of spaced transverse rods mounted in the frame below the forward end of the apron, and means mounted in the rear end of said frame at the upper end of the apron to receive the cotton therefrom and separate the cotton from the bolls and discharge the same from the machine.

In testimony whereof I hereunto affix my signature in the presence of two witnesses.

ISHAM F. WILCOXSON.

Witnesses:
HUGH METCALF,
M. D. BURRUS.